United States Patent [19]

Reynolds

[11] Patent Number: 4,816,010

[45] **Date of Patent: * Mar. 28, 1989**

[54] SPROCKET WITH RADIAL CLEARING MEANS

[75] Inventor: Michael J. Reynolds, Gladstone, Oreg.

[73] Assignee: Blount, Inc., Portland, Oreg.

[ * ] Notice: The portion of the term of this patent subsequent to Jul. 23, 2002 has been disclaimed.

[21] Appl. No.: 667,972

[22] Filed: Nov. 5, 1984

Related U.S. Application Data

[63] Continuation-in-part of Ser. No. 279,955, Jul. 2, 1981, abandoned.

[51] Int. Cl.[4] .......... F16H 57/00

[52] U.S. Cl. .......... 474/92; 30/381; 198/494

[58] Field of Search .......... 474/92; 305/11, 57; 198/494, 834; 30/381, 382, 384, 385

[56] References Cited

U.S. PATENT DOCUMENTS

| | | | |
|---|---|---|---|
| 301,743 | 7/1884 | Michael | 305/11 X |
| 1,668,778 | 5/1928 | Menningen | 305/11 |
| 3,045,502 | 7/1962 | Carlton | 30/381 |
| 3,498,346 | 3/1970 | Gasner et al. | 30/381 |
| 3,683,980 | 8/1972 | Gasner | 30/381 |
| 4,072,062 | 2/1978 | Morling et al. | 198/834 |
| 4,530,676 | 7/1985 | Reynolds | 474/92 |

*Primary Examiner*—Leslie Braun
*Assistant Examiner*—Dwight G. Diehl
*Attorney, Agent, or Firm*—John W. Stuart

[57] ABSTRACT

A drive sprocket for use with an elongate, endless saw chain, the sprocket being a substantially circular member having pockets spaced circumferentially thereabout for receiving drive tangs on the saw chain and edge margins adjacent the tang-receiving pockets against which surfaces of side links of the saw chain may rest. The pockets have enlarged portions, or bores, opening radially outwardly from the sprocket, which bores are wider than the side-to-side dimension of the side links on the chain to allow debris to clear radially from the pockets past the sides of the chain during operation. The sprocket also may have axial ports intersecting the radially disposed bores.

19 Claims, 1 Drawing Sheet

SPROCKET WITH RADIAL CLEARING MEANS

BACKGROUND AND SUMMARY OF THE INVENTION

This is a continuation-in-part of prior U.S. patent application, Ser. No. 279,955 filed July 2, 1981, now abandoned.

This invention relates to a drive sprocket for a saw chain, wherein the sprocket has pockets for receiving the drive tanks on the saw chain and debris clearing openings associated with the pockets which are wider than the side-to-side dimension of the chain to allow debris to clear radially from the sprocket past the chain.

Chain saws generally comprise four major components; an endless saw chain, an elongate bar to support the chain around the edges of which the chain is trained for travel, power drive means in the form of motor, and means to drivingly connect the shaft of the motor to the saw chain. The saw chain generally has opposed side links, interposed between which are drive links pivotally connected thereto with drive tangs extending below the bottom surfaces of the side links. Sprockets are known which have drive tang-receiving pockets of such depth that the, bottom surfaces of the side links rest against the peripheral edge of the sprocket.

A problem accompanying chain saw use is the collection of chips and other debris or foreign matter in the pockets of the drive sprocket. Such matter is carried by the drive tangs of the chain into the pockets, and eventually builds up therein unless there is some clearing means. If the debris builds up in the pocket, it can be detrimental to the chain and other parts of the equipment. For instance, as debris piles up in a pocket, it prevents the chain from seating properly on the sprocket which increases the tension in the chain as it is driven around the sprocket and bar. It also may lift the drive links from the periphery of the sprocket producing instability as the chain travels about the sprocket.

In chain saws with automatic sharpening devices positioned adjacent the sprocket, buildup of debris, chips, and other foreign matter in the pockets of the sprocket can produce uneven sharpening. Explaining further, the sharpening apparatus adjacent the sprocket is positioned to engage the tops of cutter links in the chain as they are carried in an arc about the sprocket. The sharpening means is held in a selected position spaced radially outwardly from the sprocket to grind the tops of the cutter links. Should an individual pocket be impacted with excess chips or other foreign matter it can cause the cutter link adjacent the drive link in that pocket to be shifted radially outwardly a distance farther from the sprocket than other cutter links, resulting in uneven sharpening, and possibly damage to the chain or sharpening equipment.

A general object of the present invention is to provide a novel sprocket having means permitting effective radial clearing of chips and other foreign matter from the sprocket.

A more specific object of the present invention is to provide a drive sprocket for a chain saw in which clearance ports open radially to the periphery of the sprocket and have a side-to-side dimension measured axially of the sprocket which is greater than the side-to-side dimension of the chain to be used therewith, thus allowing debris to exit radially from the sprocket past opposed sides of the chain.

Yet another object of the present invention is to provide such a novel sprocket in which drive tang-receiving pockets on the sprocket have widths through a major portion of the length thereof which are only slightly greater than the width of a drive tang on the chain to provide stability for the chain as it is driven by the sprocket, and have clearance port portions which are a minor portion of the length of the associated pocket but have a width greater than the total side-to-side width of the chain to allow debris clearing.

Yet another object of the present invention is to provide such a novel drive sprocket which includes both the radially-directed ports as previously described and also axially-directed ports intersecting the radially-directed ports for producing even more effective clearing of chips and foreign matter therefrom.

DRAWINGS

These and other objects and advantages will come more fully apparent as the following description is read in conjunction with the drawings wherein.

DESCRIPTION OF A PREFERRED EMBODIMENT OF THE INVENTION

Figure 1:
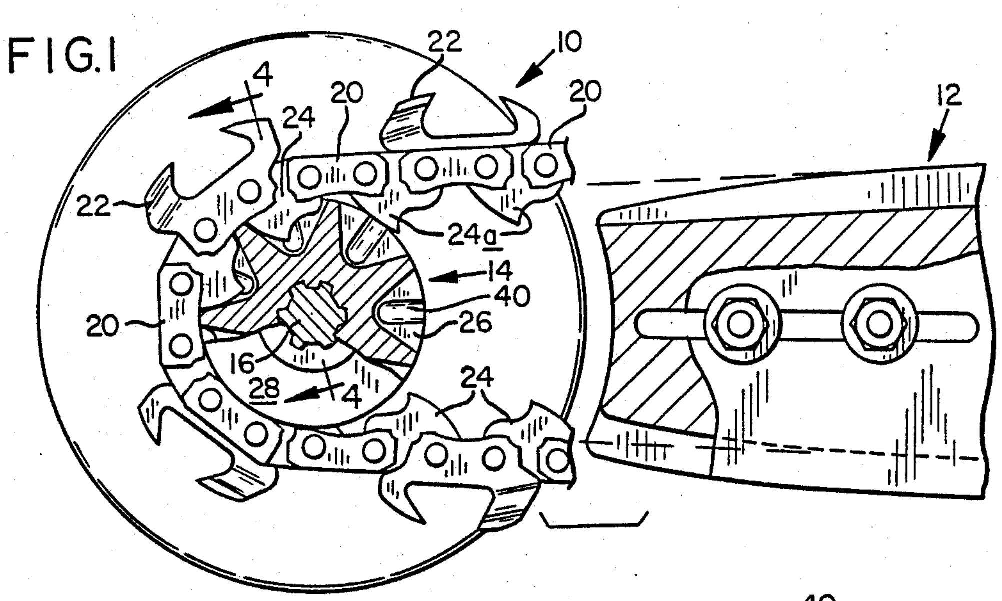
FIG. 1 illustrates a sprocket according to an embodiment of the invention mounted on a chain saw and illustrating a portion of a saw chain and bar which may be associated therewith.
Figure 2:
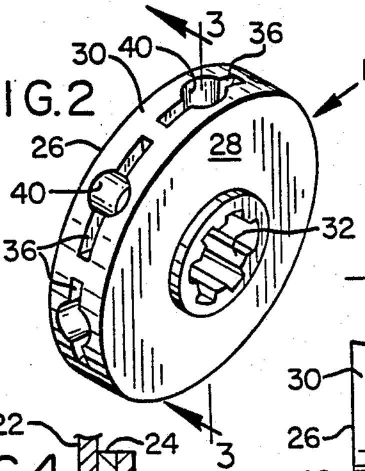
FIG. 2 is an enlarged perspective view of the sprocket of FIG. 1 removed from the chain saw.
Figure 3:
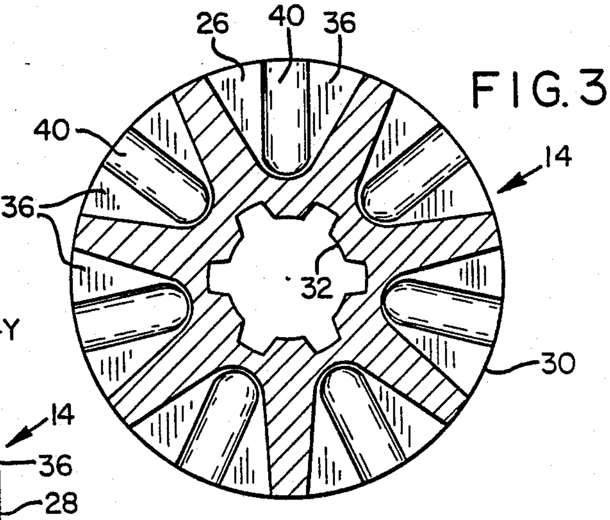
FIG. 3 is an enlarged cross-sectional view taken generally along the line 3—3 in FIG. 2.

Referring to the drawings, and first more specifically to FIG. 1, at 10 is indicated generally a portion of a saw chain which is trained about an elongate bar 12 and is driven by a sprocket 14 constructed according to an embodiment of the invention. The sprocket has a splined connection with a drive shaft 16 which is connected to the motor of a chain saw (not shown).

As is known, the saw chain has a plurality of laterally spaced, opposed side links, some of which are merely tie-straps 20 and others of which are cutter links 22. Interposed between side links 20, 22 and pivotally connected thereto are drive links 24.

Figure 4:
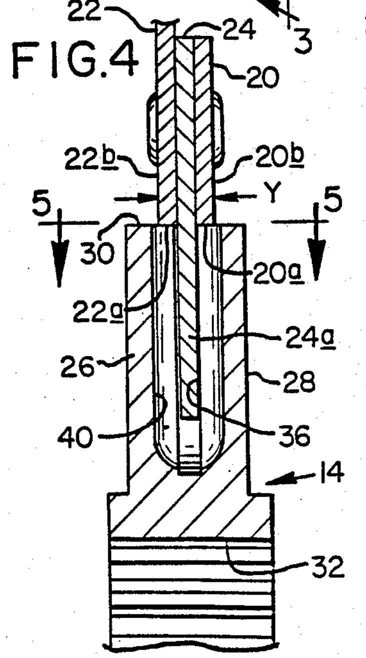
FIG. 4 is an enlarged cross-sectional view taken generally along the line 4—4 in FIG. 1.
Figure 5:
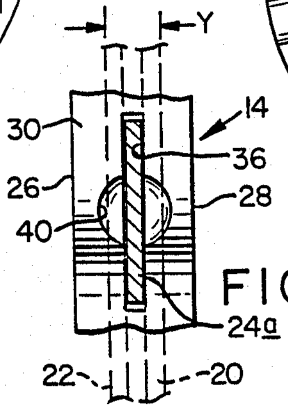
FIG. 5 is a view taken generally along the line 5—5 in FIG. 4.

As is best seen in FIG. 4, the side links have bottom surfaces **20*a*, 22*a* adapted to rest on marginal edge portions of the sprocket as will be described in greater detail below. Further, the outwardly facing surfaces 20*b*, 22*b* of the side links have a side-to-side dimension "Y" as seen in FIG. 4**, also referred to herein as a preselected first distance.

The drive link 24 has a drive tang **24*a* of a preselected length and thickness which extends below bottom surfaces 20*a*, 22*a* of the side links as is seen in FIGS. 1 and 4**.

Drive sprocket 14 is a substantially cylindrical member having opposed side wall sections 26, 28 and a peripheral edge 30 extending therebetween. A splined bore 32 extends axially therethrough.

Spaced apart circumferentially about the sprocket are drive tang-receiving pockets 36. Each pocket has a length, as measured circumferentially of the sprocket, at least as great as the length of the drive tang 24a on the chain to be received therein, and has a depth at least as great as the distance that the drive tang on the chain projects below the bottom surfaces of the side links. A pocket throughout a major portion of its length has a width slightly greater than the width of drive tang 24a, but narrower than the outer side-to-side dimension "Y" of the side links in the chain. In this way a drive tang on the chain may be received within a pocket with bottom surfaces 20a, 22a of the side links resting on edge margins of the periphery 30 of the sprocket adjacent the pockets.

Minor portions of the pockets, referred to herein as clearing portions, or openings, are illustrated at 40. Each clearing portion may be a substantially cylindrical bore as shown extending radially inwardly from the periphery of the member to a position adjacent the bottom of its associated tang-receiving pocket 36. The bore has a mouth opening to the periphery of the member which is wider than the side-to-side dimension "Y" of the side links. The bore, however, is only a minor portion of the length of the tang-receiving pocket as measured circumferentially of the sprocket whereby the drive tang is held in a relatively stable position as it is carried about the sprocket.

In operation, as the sprocket is rotatably driven, successive drive tangs 24a enter successive tang-receiving pockets 36 in the sprocket to drive the chain around bar 12. As the chain cuts wood, it picks up chips and other foreign matter, some of which are carried by the drive tangs into the pockets. Bores 40 having mouth openings at the periphery of the sprocket which are of greater width than the width of the chain allow chips and debris to exit radially from the pocket past the sides of the chain. In this way, harmful buildup of foreign matter in the pockets is prevented.

Figure 6:
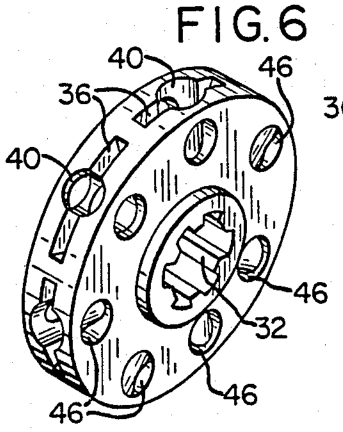
FIG. 6 is a perspective view of a second embodiment of the invention.
Figure 7:
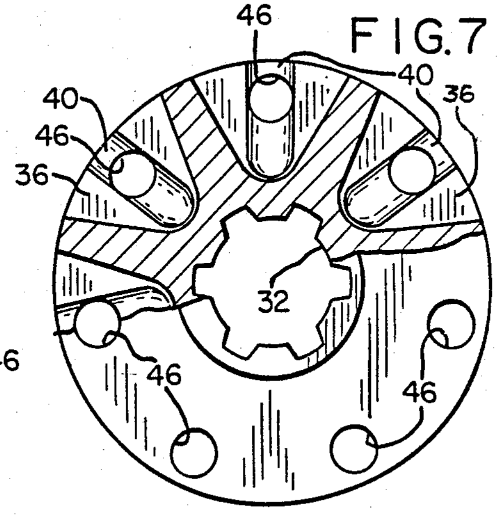
FIG. 7 is an enlarged side view of the sprocket illustrated in FIG. 6 with portions broken away.

FIGS. 6 and 7 illustrate a second embodiment of the invention. In FIGS. 6 and 7 a sprocket similar to that previously described is shown, but in this embodiment axially-extending ports 46 extend fully through the sprocket and intersect bores 40. This provides both radial and axial clearance of chips and foreign matter from the pockets. It should be recognized that ports 46 could, if desired, extend only through one side of the sprocket, rather than fully therethrough.

It should be recognized that tang-receiving pockets 36 have a width greater than the width of drive tang 24a to allow free movement of the drive tang into and out of the slot and to minimize binding while the tang is in the slot. A desirable width for the clearing portions, or openings, 40 can be expressed as a ratio relative to the width of pocket 36.

Several different chain and sprocket combinations have been tried. The structure described has proven effective in clearing debris from the tang-receiving pockets in each combination tried.

As an example we will describe here one embodiment which has been found to perform well. Three-eighths ($\frac{3}{8}$) inch pitch saw chain is widely used. In such a system, the drive tang may have a thickness of about 0.050 inch and the width of the chassis of the chain "Y" would be about 0.150 inch. For such a combination, a desirable width for the tang-receiving pocket 36 on the sprocket would be about 0.070 inch and the radial clearing portion would have a width of about 0.165 inch. Since chassis width "Y" is 0.150 inch and the width of pocket 40 is 0.165 inch, it is seen that the pocket is preferably at least ten percent (10%) wider than the width of the chain chassis. The full side-to-side dimension of the sprocket would be greater than 0.165 inch so that opposed side wall sections 26, 28 are continuous about the periphery, or rim, of the sprocket for added strength. The ratio of the width of the clearing portion 40 to the width of the remainder of the tang-receiving pocket 36 in this exemplary embodiment is on the order of 2.35 to 1. Due to the varying configuration of parts in different chains and sprockets, it has been found that this ratio of the width of the clearing portion to the width of remainder portions of the tang-receiving pocket may be as low as 2.2 to 1.

While preferred embodiments of the invention have been described herein, it should be apparent to those skilled in the art that variations and modifications are possible without departing from the spirit of the invention.

I claim:

1. A combination chain and drive sprocket wherein said chain comprises an elongate endless saw chain including a pair of opposed, facing side links having bottom support surfaces, and a drive link interposed between said side links and pivotally connected thereto, each of said side links having an outer side surface facing outwardly and away from the other side link, said outer side surfaces being spaced apart a preselected first distance, and said drive link having a drive tang of preselected length and thickness which projects below said support surfaces, and said sprocket comprises opposed side wall sections and a peripheral surface extending therebetween, said peripheral surface having tang-receiving pockets formed therein which extend radially inwardly from the peripheral surface, a pocket being at least the length of said drive tang and having a width greater than the thickness of said drive tang but less than said first distance, whereby said bottom support surfaces of the side links rest on edge margins of the peripheral surface adjacent the pocket, a pocket also having an enlarged clearing opening intermediate the ends of the pocket, which clearing opening extends radially of said sprocket and opens through said peripheral surface at a mouth which is wider than said first distance and shorter than said drive tang when measured peripherally of said sprocket.

2. The combination of claim 1, wherein said mouth of said clearing opening is less than half the length of its associated pocket.

3. The combination of claim 1, wherein the mouth of said clearing portion is at least 10% wider than said first distance.

4. The combination of claim 1 which further comprises a second clearing opening extending through a side wall section of said sprocket and intersecting said first-mentioned clearing opening in a region spaced radially inwardly on said sprocket from said peripheral surface.

5. The combination of claim 1, wherein said drive tang extends a defined distance below said support surfaces of the side links and said clearing opening extends radially inwardly of said sprocket a distance greater than said defined distance.

6. The combination of claim 5, wherein said clearing opening has a width greater than the width of said tang-receiving pocket extending from the peripheral surface of the sprocket to a depth greater than said defined distance.

7. A combination chain and drive sprocket wherein said chain comprises a saw chain having spaced pairs of opposed side links connected to interposed drive links having drive tangs thereon, said sprocket comprising a substantially cylindrical member having a plurality of elongate tang-receiving pockets spaced circumferentially thereabout and extending radially inwardly from the periphery thereof to receive the drive tangs of the chain with bottom surfaces of said side links resting on marginal edge portions of the periphery of said member adjacent said pockets, the majority of the length of a pocket as measured circumferentially of the member having a width as measured axially of said member which is less than the distance between outwardly facing surfaces of the side links of the chain, with a minor clearing portion of the length of a pocket having an opening width at the periphery of said member which is greater than the distance between the outwardly facing surfaces of said side links to allow debris collected in a pocket to exit radially therefrom and past a side of said chain.

8. The combination of claim 7, wherein said clearing portion of a pocket comprises a bore extending radially inwardly from the periphery of said member to a region adjacent the bottom of said pocket.

9. The combination of claim 7, wherein said clearing portion is substantially centered in relation to remainder portions of its associated pocket as measured axially of said member, whereby substantially equal parts of said clearing portion extend to opposite sides of said pocket to permit debris to clear from said pocket along both sides of said chain.

10. The combination of claim 7 which further comprises a clearance port extending axially through a side wall of said member and intersecting said clearing portion in a region spaced radially inwardly from the periphery of said member.

11. The combination of claim 7, wherein said drive tangs of the chain extend a defined distance below the bottom surfaces of said side links, and said pocket and clearing portion extend radially inwardly of the sprocket a distance greater than said defined distance.

12. The combination of claim 11, wherein said clearing portion has a width greater than the width of said tang-receiving pocket extending from the periphery of the sprocket to a depth greater than said defined distance.

13. A drive sprocket for use with an elongate endless saw chain including a pair of opposed side links having bottom support surfaces and a drive link pivotally interconnected between said side links and having a drive tang which projects below said support surfaces, said sprocket comprising opposed side wall sections and a peripheral surface extending therebetween, said peripheral surface having pockets formed therein extending radially inwardly from said peripheral surface and having a first width adapted to receive the drive tangs of such chain with the bottom support surfaces of the side links resting on the peripheral surface adjacent the pocket, a pocket also having an enlarged radially extending clearing opening intermediate the ends of the pocket which opens through said peripheral surface at a mouth which is at least 2.2 times said first width and is shorter than said pocket as measured peripherally of said sprocket.

14. The sprocket of claim 13, wherein the mouth of said clearing opening is less than half the length of its associated pocket.

15. The sprocket of claim 13 which further comprises a second clearing opening extending through a side wall section of said sprocket and intersecting said first-mentioned clearing opening in a region spaced radially inwardly on said sprocket from said peripheral surface.

16. A drive sprocket for use with a saw chain having spaced opposed side links connected to interposed drive links having drive tangs thereon, said sprocket comprising a substantially cylindrical member having a plurality of elongate pockets spaced circumferentially thereabout and extending radially inwardly from the periphery thereof, a pocket having a first width to receive the drive tang of such chain with bottom surfaces of side links resting on marginal edge portions of the periphery of said member adjacent said pocket, the majority of the length of the pocket as measured circumferentially of the member being of said first width, and further comprising a clearing portion which is a minor portion of the length of the pocket, said clearing portion opening at a mouth at the periphery of said member which is at least 2.2 times said first width to aid in the exit of debris collecting in a pocket.

17. The sprocket of claim 16, wherein said clearing portion comprises a bore extending radially inwardly from the periphery of said member to a region adjacent the bottom of said pocket.

18. The drive sprocket of claim 16, wherein said clearing portion is substantially centered in remainder portions of its associated pocket as measured axially of said member, whereby substantially equal parts of said clearing portion extend to opposite sides of said pocket.

19. The sprocket of claim 16 which further comprises a clearance port extending axially through a side wall of said member and intersecting said clearing portion in a region spaced radially inwardly from the periphery of said member.

* * * * *